United States Patent [19]
Ton That

[11] 3,796,558
[45] Mar. 12, 1974

[54] TANK FURNACE FOR GLASS-MAKING

[75] Inventor: Thuan Ton That, Maubeuge, France

[73] Assignee: Boussois Souchon Neuvesel, Paris, France

[22] Filed: July 3, 1972

[21] Appl. No.: 268,904

[30] Foreign Application Priority Data
July 29, 1971  France ............................... 71.27876

[52] U.S. Cl. ......................... 65/206, 65/337, 65/347
[51] Int. Cl. ............................................. C03b 5/20
[58] Field of Search ...................... 65/337, 347, 206

[56] References Cited
UNITED STATES PATENTS
2,064,546  12/1936  Kutchka ........................... 65/337 X
3,183,072  5/1965  Long ................................. 65/355 X Primary Examiner—Arthur D. Kellogg
Attorney, Agent, or Firm—Young & Thompson

[57] ABSTRACT

This invention relates to a tank furnace for glass-making. The tank has lateral walls disposed on each side of the longitudinal axis of the furnace and each defining a recess which serves as a deslagging or skimming pocket, that recess being provided with at least one upstream wall and at least one downstream wall. At least one portion of the upstream wall of the recess is oriented at an oblique angle with respect to the longitudinal axis of the tank furnace, and the downstream wall is substantially at right angles to this axis.

4 Claims, 7 Drawing Figures

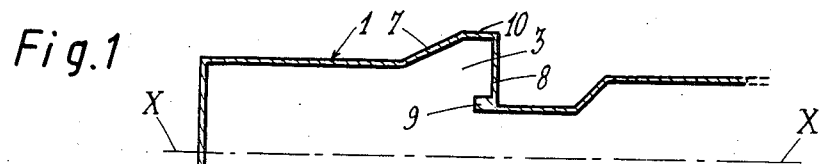
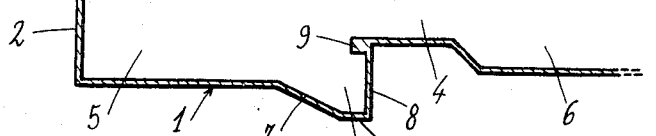
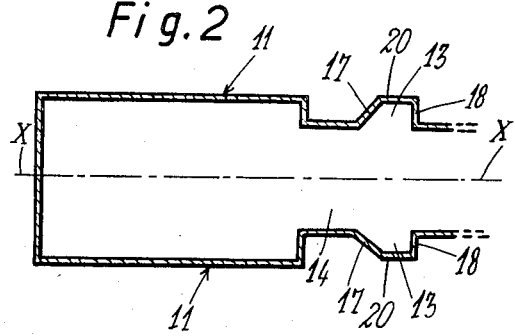
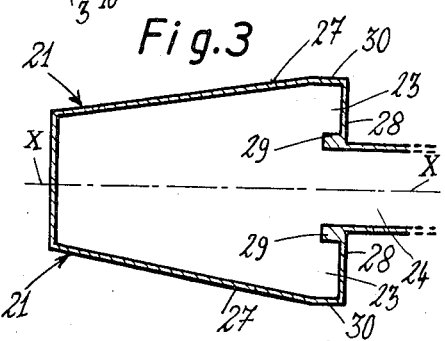
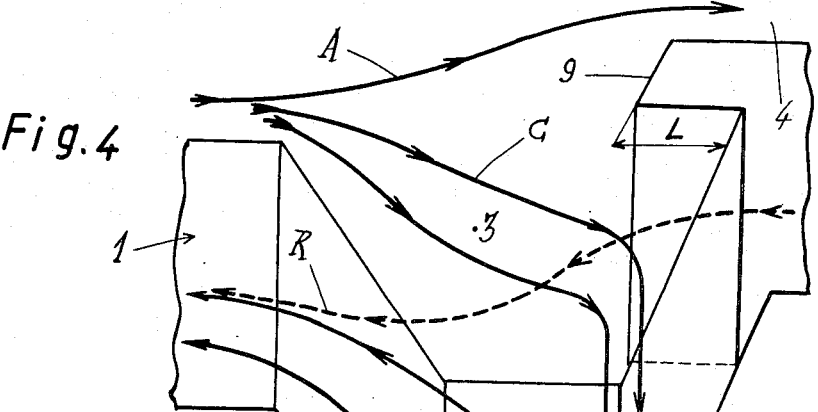
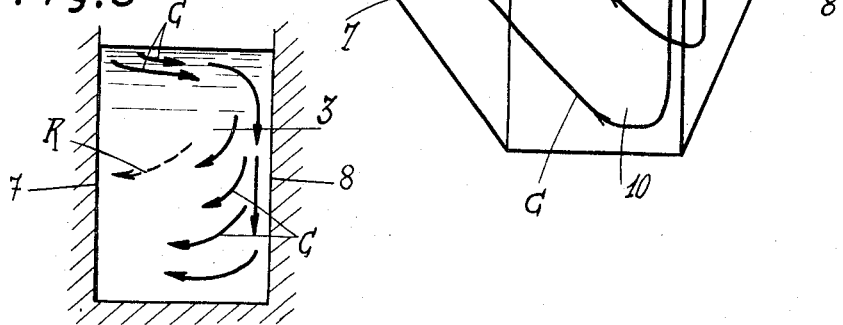

TANK FURNACE FOR GLASS-MAKING

This invention relates to a tank furnace for glass-making.

It is known that, in tank furnaces, the production of a glass having a uniform and homogeneous consistency is dependent on the convection currents which are set up in the molten mass contained in the tank. These currents in turn result from the geometry of the tank and from the thermal conditions which prevail in the molten glass. In conventional tank furnaces, the lowest temperatures are recorded on the one hand in an upstream zone in which the relatively cold charging batch is introduced and, on the other hand, in the vicinity of the discharge end of the tank. Since the hottest zone is located in the central portion of the tank furnace, namely as a rule at the level of the third port, a stream of glass glows downstream from said zone whilst a subjacent return stream which starts from the discharge end flows upstream towards the hot zone.

In the vicinity of the lateral walls of the tank furnace, the temperature of the glass also tends to decrease, with the result that heterogeneous glass charged with impurities and sometimes containing dissolved refractory material is carried along the edges in the downstream direction. In order to trap this heterogeneous glass which is charged with surface impurities, provision is made for recesses which serve as deslagging or skimming pockets. These recesses are usually rectangular, have a wide range of different dimensions, and are located in the majority of cases at the end of the melting zone and are oriented at right angles to the axis of the tank furnace.

It has been found that deslagging pockets of this type make it possible to collect only a very small percentage of the glass which flows along the edges. These pockets are therefore limited in their efficiency and only retain a few impurities having a density which is lower than that of the glass. Moreover, the temperature measurements which are taken at the level of the deslagging pockets in a transverse plane of the tank furnace show that the temperature of the siege is of minimum value in the vicinity of the axis of the furnace, with the result that the return current is colder in the central portion of this latter than the currents which come from the pockets. In consequence, these currents of heterogeneous glass which originate from the pockets progress downstream in the direction of the refining zone, which is evidently detrimental to the quality of the glass obtained.

In one known device, it has been endeavored to find a remedy for these disadvantages by placing the deslagging pockets at an oblique angle with respect to the longitudinal axis of the tank furnace. In this design, the lateral walls of the pockets are parallel and inclined to the axis of the furnace at an angle which is slightly smaller than 90° and bridgewalls are immersed at their inlets.

This type of tank furnace does not prove wholly satisfactory since it is observed that the currents of glass pass out of the pockets in a direction which is practically perpendicular to the longitudinal axis of the furnace. Said currents are then transferred to the central zone of the furnace and tend to be carried downstream instead of combining with the return current. Moreover, the upstream wall of said pockets is inclined to the axis of the furnace at a very sharp angle and this is not readily conducive to admission of the currents of glass. Finally, the presence of immersed bridgewalls which are subject to rapid wear and are difficult to replace constitutes a costly requirement.

The aim of the invention is to increase the efficiency of deslagging pockets to an appreciable degree and to modify the flow pattern of the convection currents within the molten mass in such a manner as to ensure that the maximum quantity of heterogeneous glass which penetrates into said pockets is returned towards the hottest zone.

In accordance with the invention, the tank furnace for glass-making, in which the tank has lateral walls disposed on each side of the longitudinal axis of the furnace and each defining a recess which serves as a deslagging or skimming pocket, said recess being provided with at least one upstream wall and at least one downstream wall, is characterized in that at least one portion of the upstream wall of said recess is oriented at an oblique angle with respect to the longitudinal axis of the tank furnace, and that the downsteam wall is substantially at right angles to said axis.

By virtue of this characteristic feature, the molten glass which flows along the lateral walls passes readily into the deslagging pockets. Moreover, the geometry of said pockets results in temperature dissymmetry between their upstream and downstream walls such that a high proportion of the glass which has penetrated into the pockets combines with the return current which flows upstream towards the hot zone.

In accordance with a further characteristic feature, in the case of a tank which is provided with a throat downstream of the recesses, the downstream wall of each recess forms in the vicinity of the siege a projection which is substantially parallel to the axis of the tank furnace.

Said projection tends to deflect the currents of glass which pass along the edges of the furnace towards the deslagging pockets; the return current is thus prevented from penetrating into said pockets, with the result that the glass which has penetrated into the pockets can more readily be returned upstream.

Provision is preferably made for coolers which are placed against at least one portion of the downstream wall of each recess; the dissymmetry between the temperatures of the downstream and upstream walls of the recesses is thus increased.

Further particular features of the invention will become apparent from the description which now follows, reference being made to the accompanying drawings which are given by way of non-limitative example, and in which:

FIG. 1 is a diagrammatic plan view of a glass-making tank furnace in accordance with a first embodiment.

FIGS. 2 and 3 are views which are similar to FIG. 1 and show two further embodiments.

FIG. 4 illustrates in perspective the currents of glass which are set up in a deslagging pocket of the tank shown in FIG. 1.

FIG. 5 is a view in elevation which illustrates said currents.

Figure 6:
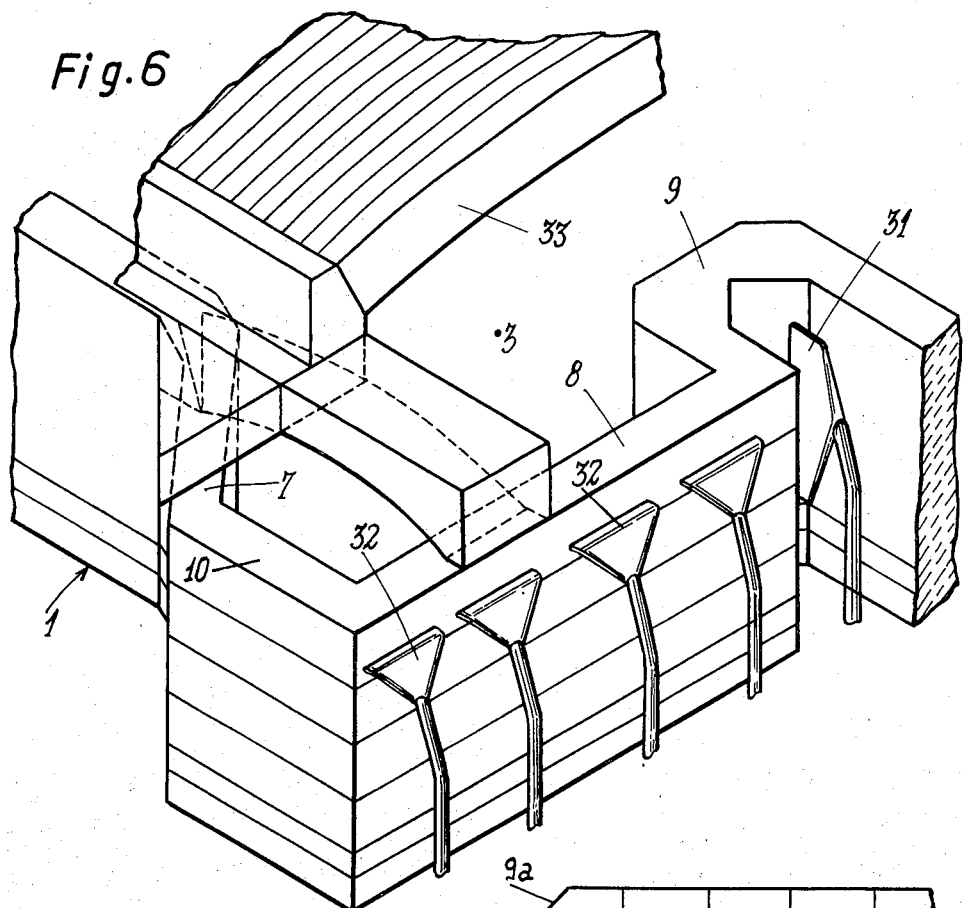
FIG. 6 is a fragmentary view in perspective showing a deslagging pocket of the tank of FIG. 1 with the corresponding crown of the furnace.
Figure 7:
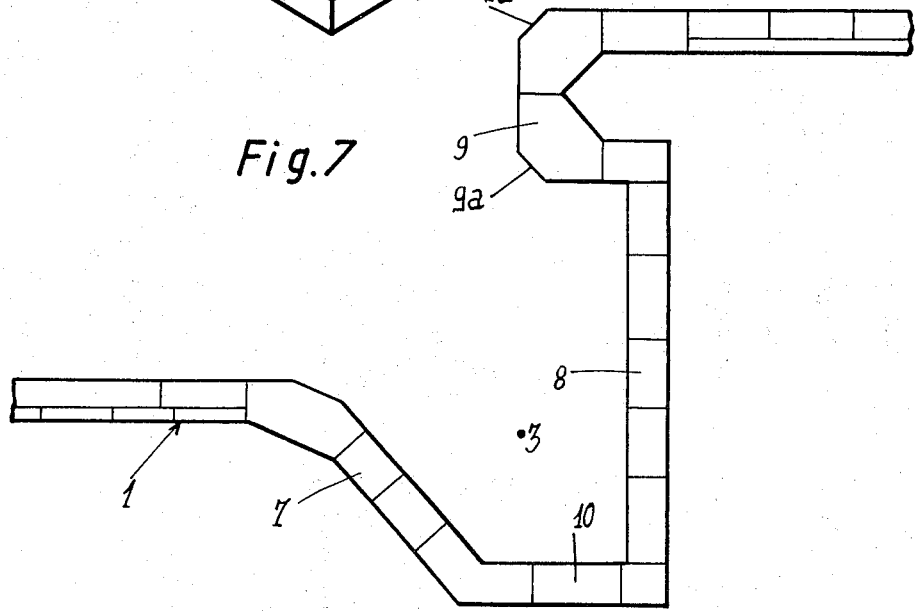
FIG. 7 is a plan view of said pocket, the coolers which can be seen in FIG. 6 having been omitted for the sake of simplicity.

FIG. 1 illustrates diagrammatically a glass-making tank furnace comprising two side walls 1 which extend from the charging end 2 of the furnace and are disposed on each side of the longitudinal axis X—X of this latter. Each side wall delimits a recess 3 located upstream of the throat 4 which separates the melting zone 5 from the refining zone 6 of the furnace.

The side walls 1 are parallel to the axis X—X over the greater part of their length. However, a portion of wall 7 of each recess 3 is oriented at an oblique angle with respect to said axis; in this embodiment, said portion constitutes the actual upstream wall of the recess 3. The downstream wall 8 of said recess is substantially perpendicular to the axis X—X and terminates in the vicinity of the throat 4 in a spur 9 which is substantially parallel to the axis X—X and directed towards the upstream end. The recess also comprises an intermediate wall 10 which is parallel to the longitudinal axis X—X of the furnace. The recesses 3 constitute deslagging or skimming pockets into which the molten glass penetrates as this latter flows in the downstream direction along the side walls.

In the embodiment of FIG. 2, the side walls 11 are parallel to the axis X—X in the melting zone and the recesses 13 are formed downstream of the throat 14. In this case also, a portion of oblique wall 17 constitutes the upstream wall of each recess 13, the downstream wall 18 of which is perpendicular to the axis X—X. The recess 13 is delimited by the intermediate wall 20 together with the upstream wall 17 and downstream wall 18.

In the embodiment which is illustrated in FIG. 3, the side walls 21 are oriented at an oblique angle with respect to the axis X—X of the furnace over their full length upstream of the recesses 23, with the result that the upstream wall 27 of said recesses can be considered as coinciding with the end portion of the walls 21. As in the example of FIG. 1, the downstream walls 28 of the recesses are substantially perpendicular to the axis X—X and terminate in the vicinity of the throat 24 in a spur 29 which is substantially parallel to the axis X—X. The recesses 23 are delimited by the intermediate walls 30 together with the upstream wall 27 and downstream wall 28.

It should be made clear at this point that the intermediate walls of the recesses such as the walls 10, 20 or 30 can be completely suppressed, in which case the upstream walls are joined directly to the downstream walls of the recesses (this alternative form of construction having been omitted from the figures).

FIGS. 4 and 5 illustrate the flow pattern of the convection currents which are set up in the mass of molten glass contained in the tank of FIG. 1.

By virtue of the obliquity of the upstream wall 7 of each deslagging pocket 3, the molten glass which flows along the edges readily enters these pockets. Moreover, the pocket-profile dissymmetry which is due to the arrangement of the downstream wall 8 at right angles to the axis X—X has a consequential effect on the thermal state of the furnace at the level of the pockets. This results in downward motion of the glass currents C into said pockets and in orientation of said currents in the upstream direction when these latter pass out of the pockets, and not in a flow towards the throat 4 in the direction of the downstream or inflowing current A. The glass currents C therefore meet the subjacent return current R and combine with this latter so as to return upstream towards the hot zone.

The spur 9 has the effect of enhancing this phenomenon since it plays a part in deflecting the glass currents C towards the deslagging pockets and facilitates the return of said currents in the upstream direction while preventing them from being directed towards the throat 4; the spur also serves to prevent the return current R from penetrating into the pockets. A surprising effect which has also been shown by experience lies in the fact that the effective length L of the spur 9 plays a critical part in the orientation of the outlet currents which pass out of the deslagging pocket 3. In a manner which is practically independent of the dimensional characteristics of the furnace, the best results are obtained when L is at least equal to 800 mm. When these values are adopted, there is no danger of stopping of said outlet currents by the main return current of the furnace.

In order to produce even greater dissymmetry between the temperatures of the upstream and downstream walls of the pockets 3, provision can be made for coolers 31, 32 of the air type, for example, which can be placed against the downstream wall 8 including the spur 9, as illustrated in FIG. 6. In this example of industrial construction, the side walls as well as the crown 33 which surmounts the tank furnace are made of refractory material. The cooler 31, which is oriented vertically and extends to the full height of the spur 9, serves to cool said spur in order to limit erosion by the glass. To the same end, the side walls of the spur 9 are chamfered at 9a. The horizontality-oriented coolers 32 are placed in the vicinity of the top edge of the tank furnace and the action of these coolers is such as to promote the downward motion of the glass currents C in contact with the wall, the temperature of which decreases progressively from the top to the bottom. Cooling of said wall downstream of the recess is advantageously such that the temperature at the level of the bottom of the downstream wall is lower by approximately 50° C than the temperature of the upstream wall at the same level. Accordingly, the temperature gradient in a transverse section of the tank at the level of the deslagging pockets is particularly favorable since, in contrast to conventional tank furnaces, the temperature at the level of the siege or bottom is higher in the vicinity of the axis X—X than along the edges of the tank.

In the examples of construction of FIGS. 1 and 2, the angle between the oblique upstream wall 7 or 17 of the recesses 3 or 13 and the axis X—X of the furnace is preferably within the range of 35 to 50° approximately, the lower limit being dictated by considerations of a technological order.

In the example of construction of FIG. 3, the angle between the oblique side wall 21 of the furnace (or the upstream wall 27 of the pocket since these walls coincide) and the axis X—X is preferably within the range of 2.5° to 5°; this angle depends primarily on the dimensions of the furnace.

Experience has shown that, by virtue of the arrangements described in the foregoing, a glass stream representing 10 to 15 % of the width of the tank can be caused to penetrate into each deslagging pocket, which constitutes a considerable improvement over the known technique.

As can readily be understood, the quality of the glass obtained is improved to an appreciable extent since the current which passes downstream into the refining zone is remarkably homogeneous and free from practically all impurities.

It would clearly be possible to make many changes in the above forms of construction while remaining within the scope of the invention. Thus it follows that, in the case of FIG. 6, the coolers 31, 32 could be of the water type.

What I claim is:

1. In a tank furnace for glass-making, in which the tank has lateral walls disposed on each side of the longitudinal axis of the furnace and each defining a recess which serves as a deslagging or skimming pocket, said recess being provided with at least one upstream wall and at least one downstream wall, at least one portion of the upstream wall of said recess being oriented at an oblique angle with respect to the longitudinal axis of the tank furnace, said downstream wall being substantially at right angles to said axis and a throat being located downstream of each recess; the improvement in which the downstream wall of each recess terminates in the vicinity of the throat in a spur which is substantially parallel to the longitudinal axis of the furnace and directed towards the upstream end.

2. A furnace according to claim 1, wherein the length of each spur is at least equal to 800 mm.

3. A tank furnace according to claim 1, and coolers against at least one portion of the downstream wall of each recess.

4. A tank furnace according to claim 3, wherein the coolers are in the vicinity of the top portion of the downstream wall of the recess.

* * * * *